United States Patent
Bollgohn et al.

(10) Patent No.: US 6,769,320 B1
(45) Date of Patent: Aug. 3, 2004

(54) MULTIFUNCTIONAL OPERATING DEVICE

(75) Inventors: Andreas Bollgohn, Ingolstadt (DE);
Ricky Hudi, Kasing (DE); Wolfram Remlinger, Ingolstadt (DE); Jurgen Schroder, Wettstetten (DE); Werner Hamberger, Lenting (DE)

(73) Assignee: Audi AG (DE)

( * ) Notice: Subject to any disclaimer, the term of this patent is extended or adjusted under 35 U.S.C. 154(b) by 132 days.

(21) Appl. No.: 10/070,065

(22) PCT Filed: Aug. 11, 2000

(86) PCT No.: PCT/EP00/07829
§ 371 (c)(1),
(2), (4) Date: Feb. 27, 2002

(87) PCT Pub. No.: WO01/19639
PCT Pub. Date: Mar. 22, 2001

(30) Foreign Application Priority Data

Sep. 15, 1999 (DE) .......................................... 199 44 324

(51) Int. Cl.⁷ .......................... G01D 7/00; G01D 11/00;
B60K 37/06; H01H 9/00; H01H 25/00
(52) U.S. Cl. ................... 73/866.3; 200/5 R; 307/10.1; 340/461
(58) Field of Search .................... 73/866.3; 200/5 R; 307/10.1; 340/326, 815.69, 407.1, 407.2, 459, 461–462

(56) References Cited

U.S. PATENT DOCUMENTS

| | | | | |
|---|---|---|---|---|
| 5,747,759 A | * | 5/1998 | Lochmahr et al. | 200/5 R |
| 6,100,476 A | * | 8/2000 | Adamietz et al. | 307/10.1 X |
| 6,191,796 B1 | * | 2/2001 | Tarr | 345/433 |
| 6,448,893 B1 | * | 9/2002 | Dobberkau et al. | 340/461 |

FOREIGN PATENT DOCUMENTS

| | | | | |
|---|---|---|---|---|
| DE | 4443912 A1 | * | 6/1996 | B60K/35/00 |
| DE | 29806461 U1 | * | 6/1998 | B60K/37/66 |
| EP | 701 926 A2 | * | 3/1996 | B60R/16/02 |

* cited by examiner

Primary Examiner—Thomas P. Noland
(74) Attorney, Agent, or Firm—Stevens, Davis, Miller & Mosher, LLP

(57) ABSTRACT

This invention relates to a multifunctional operating device (12), especially for mounting into a vehicle, with a rotary switch (16) for selecting functions that can be represented within a display field (40) and on a monitor unit (38). The multifunctional operating device (12) is provided with a combination of the rotary switch (16) and several press switches (18). The press switches (18) are arranged around the rotary switch (16) and are configured and/or arranged in such a way that said press switches are haptically distinguishable. The arrangement of display fields (42) on the monitor unit (38) corresponds at least schematically to the arrangement of the press switches (18), whereby the display fields are allocated to the press switches.

20 Claims, 3 Drawing Sheets

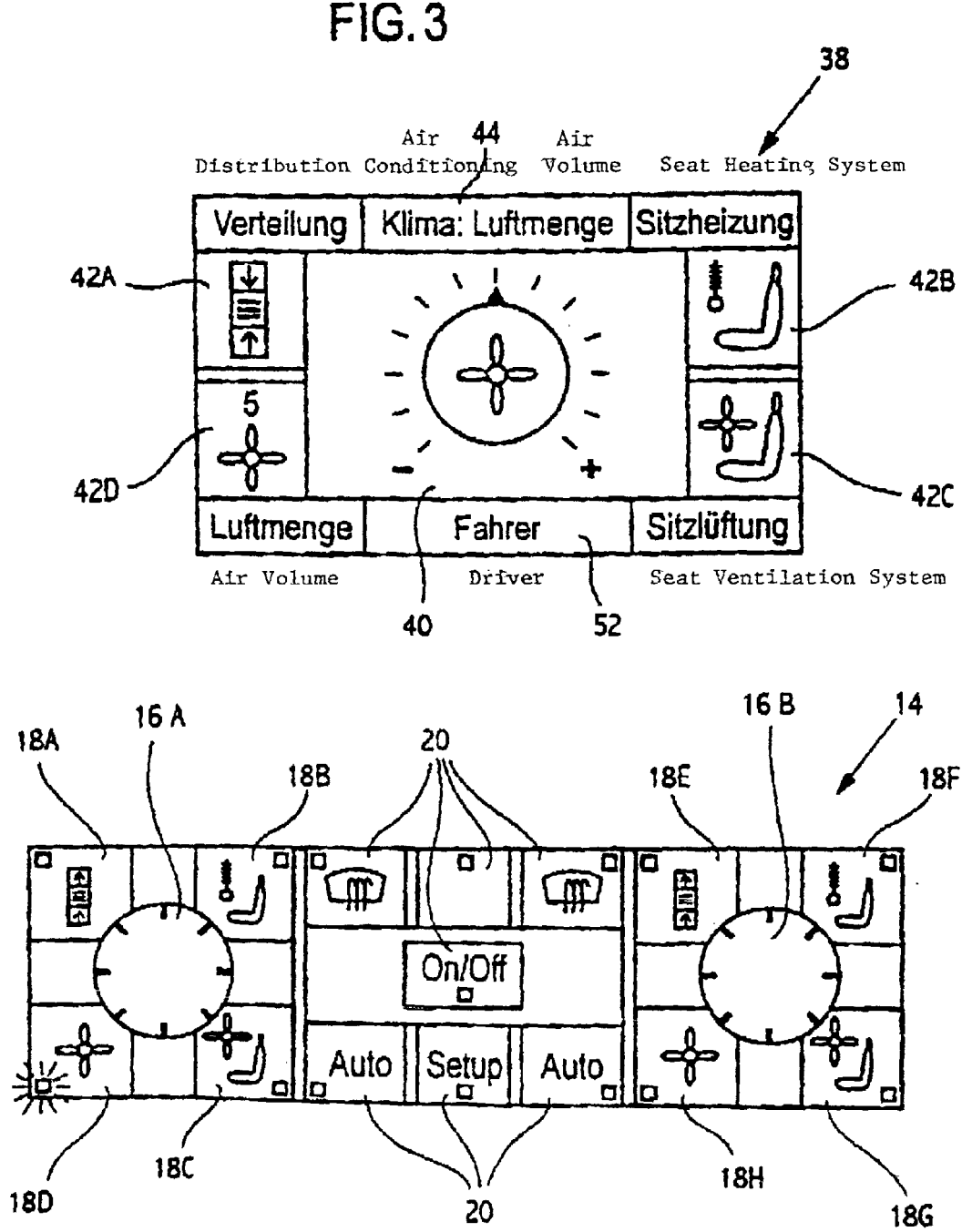

MULTIFUNCTIONAL OPERATING DEVICE

BACKGROUND OF THE INVENTION

This invention relates to a multifunctional operating device as specified in the preamble of claim 1.

Generic multifunctional operating devices for motor vehicles are generally known. Reference is made in this connection to DE 38 36 55 A1 as an example from the state of the art. This citation describes a multifunctional operating mechanism which has as a central element a rotary switch which may be operated without forcing the driver to take his eyes off the road. This rotary switch may be rotated about a rotational axis and may also be moved axially against the force of a spring. The rotary switch also has locking positions for specific angles of rotation for immobilization at these angles. A locking resistance must be overcome in order to rotate the rotary switch from one position to another. The multifunctional operating mechanism also has a screen on which individual operable mechanisms of the motor vehicle may be represented by indicator symbols. Such mechanisms may be, for example, in the form of a navigation device, a vehicle telephone, a vehicle radio, or another device. One of the devices may be selected by means of the rotary switch, since the indicator selected by the rotary switch currently displayed on the screen is optically enhanced. Brief application of pressure to the rotary switch calls up the optically enhanced device and a list of various selectable functions appears on the screen as a menu strip. The individual functions may now also be selected by rotation of the switched and called up by brief application of pressure. Consequently, a list of selectable subsidiary functions may be displayed on the screen. The push button must be depressed for a longer period in order to return from this list to the list of functions.

Although the multifunctional operating device described does offer the option of selecting a function from among a large number of possible functions, it is time consuming and complicated to call up a function of another device from a displayed list of subsidiary functions of a specific device. In addition, the user must watch the screen constantly when selecting a function from the list displayed on the screen, something which in particular distracts the driver from performing his proper task.

EP 0 701 926 A describes a multifunctional operating device which has a screen and in which individual functions in a group of functions are selected by means of a rotary switch which has an enter function for selection of a function. Press switches arranged side by side below the screen are providing for selection of the overriding function groups. Additional operating elements mounted on the side of the screen are provided for frequently selected functions. After a function group has been selected by means of one of the press switches, the functions associated with a specific function group are displayed on one or more operation control surfaces of the screen, the function selected by the rotary switch being graphically enhanced. After the enter function of the rotary switch has been triggered, either the function is executed or subsidiary functions associated with the particular function are displayed on the screen and may be selected in keeping with the functions.

DE 298 06 461 U1 discloses a multifunction operation field which is mounted in the area of an impact head of a steering wheel. This multifunction operation field has operating elements with fixed association and operating elements with multiple function associations. Switching elements and a first group of operating elements in the form of capacitive operation sheets are provided as operating elements, while multifunction association is accomplished by means of scroll selection elements. The functions necessary for operation and matching of the parameters of the particular equipment element are associated with a second group of operating elements in the form of scroll selection elements by selection of a specific equipment element of a vehicle by means of such a scroll selection element. A display is provided for optical representation of operation data or operating state. While the switching elements, the scroll switching elements and the first group of operating elements in the form of capacitive operator sheets, are arranged in a circle, the second group of operating elements in the form of capacitive operator sheets is positioned inside the area of the steering wheel delimited by the circle. A keyboard as input element and a microphone for use of a telephone system may also be mounted in this area.

Another example from the state of the art is represented by DE 44 43 912 A1. The operating device has a screen and an operating area associated with the screen. The screen and the operating area are mounted so as to be spatially separated from other. The screen is divided into a number of fields associated with individual functions or function groups. The same arrangement is reproduced on the operation surface. The individual fields on the operation control surface are separated from each other by prominent boundaries so as to achieve operability without forcing the driver to take his eyes off the road. To select a function or a group of functions a user runs a finger over the fields of the operation area. The field is optically enhanced in each case which is associated with the field on the operating surface. In order to call up a function, pressure is applied to a selected field. A disadvantage of the operating device described, however, is that the number of selectable functions or function groups is limited at the outset by the number of fields present. For example, input of a series of characters may be necessary for certain applications. If each of the fields in the operating device is filled with a letter, a digit, or another written symbol, a very large number of fields are required on the screen and accordingly on the operation control surface. But if such a large number of fields are provided for the operating device, the operation control surface becomes increasingly confusing and erroneous selection of fields may occur. Multiple occupation of the individual fields would rather act to the detriment of operating comfort. In addition, the need for constant observation of the screen for choice of a desired function is a disadvantage during operation of a vehicle.

SUMMARY OF INVENTION

Consequently, it is the object of this invention to prepare a multifunctional operating device with improved operating comfort.

This object is attained by means of a multifunctional operating device having the features specified in claim 1. The dependent claims relate in particular to especially advantageous developments of the invention.

It is thus claimed for the invention that a multifunctional operating device is provided whose operating elements can be operated without forcing the driver to take his eyes off the road. The multifunctional operating device has a rotary switch for selection of functions which may be displayed in a display field on a monitor unit. The rotary switch thus permits selection of a function from among a number of functions almost as large as desired. Haptically distinguishable press switches are mounted around the rotary switch, which press switches are also associated with display fields on the monitor unit. This arrangement is easily understandable to the user, since the arrangement of the display fields associated with the press switches on the monitor unit corresponds at least schematically to the arrangement of the press switches. At the same time, the disadvantages, described above, of a rotary switch combined with press switches is eliminated. The display fields on the monitor associated with the press switches enables the user, independently of the functions displayed, which may be selected with the press switch, to select functions which are displayed in the display fields associated with the press switches. Such functions may above all be ones very frequently selected or ones which are superior to the functions shown in the display field associated with the rotary switch. In addition, the arrangement of press switches around a rotary switch is especially favorable from the ergonomic viewpoint, since the user can find the press switch desired from the rotary switch unerringly without a glance at the monitor unit and actuate it, and without the need for passing over other press switches, with the result that erroneous pressing of another press switch is prevented. A look at the monitor unit is required only to obtain information regarding the switch which is associated with the desired function. Hence the time during which the user's attention is diverted to observe the screen is considerably reduced. A device such as this affords high comfort in operation and at the same time great flexibility as regards possible applications. It may be sensible, for example to enable the user to make an extremely fast selection, something ensured only by actuation of press switches. In addition, erroneous actuations are largely eliminated because of the extremely favorable arrangement of the press switches relative to the rotary switch and the haptic distinguishability of the press switches.

Especially favorably developments of the invention are cited in what follows. However, a brief explanation must first be given of the meanings of the individual terms employed. A function control device is a device which may be operated by the multifunctional operating device, as for example a radio set, a compact cassette set, a television set, a vehicle computer, a compact disk player, a telephone, a theft prevention system, an air conditioning unit, a time control and time display unit, a navigation system, a traffic information system, a mail system, a speed control system, or the like. A function control element is subordinate to the function control device, as function control elements which control air flow distribution or the amount of air to be admitted are subordinate to an air conditioning system. A functional value is a value which is subordinate to a function or a function control element. Thus, for example, it can indicate the volume of air to be supplied. A function, on the other hand, is subordinate to a functional control element and thus, for example, concerns switching from manual operation to automatic operation in operation of an air conditioning system.

A first advantageous development of the invention provides that the position of the display fields associated with the rotary switch relative to the display fields associated with the press switches corresponds at least schematically to the position of the rotary switch relative to the press switches. The operability of the multifunctional operating device is simplified in this way to the end that exclusively the user is informed by examining the monitor unit of the arrangement of the rotary switch relative to the press switches on the operation control surface.

At least one indicator symbol may be displayed to advantage within a display field; an indicator symbol may symbolize a function control device, a function control element, a function, or a function value, or the indicator symbol may be a written character.

Actuation of one of the press switches can call up a menu listing at least one indicator symbol, the menu being displayed in the display field associated with the rotary switch. Consequently, the indicator symbols which may be selected by the rotary switch are subordinate to the indicator symbols selectable with the press switches, as a result of which a clarity of presentation is created which further enhances operating comfort.

In another especially advantageous development of the invention, provision is made such that, as a result of actuation of a confirm switch, after selection of the indicator symbol by the rotary switch, the function control device or the function control element may be activated, the function may be performed, or the function value may be removed or the written symbol may be set.

In addition, a submenu associated with the indicator symbol selected by the rotary switch and containing at least one indicator symbol may be displayed in the display field associated with the rotary switch by actuating a confirm switch or the confirm switch. In this way any desired number of submenus with any desired number of indicator symbols may be called up in succession. The number of selectable functions and/or function values is consequently almost unlimited.

In another embodiment provision may be made such that actuation of one of the press switches renders a function control device of a function control element activatable or a function executable or a function value removable, so that frequently occurring operating steps may be carried out rapidly and accurately.

The multifunctional operating device may also have at least one selector switch by means of which at least one or one additional function control device may be selected, the selector switch being in the form of a rotary, press, or sliding switch. Especially fast selection of the function control device is guaranteed by use of at least one of these selection switches. In this way the user can operate various function control devices in very rapid succession.

After actuation of the selector switch the function control device selected may be displayed as an indicator symbol in a display field provided for this purpose on the monitor unit, as a result of which the user is informed of the function control device he has just activated and thus may operate.

After the selector switch has been actuated, the function control elements and/or functions and/or function values may be displayed as indicator symbols within the display fields associated with the press switches. The user is accordingly informed in a very clearly presented display of the function control elements and/or functions and/or function elements which he may select with a specific function control device.

Another especially advantageous development of the invention provides that the rotary switch is also a press switch which may be moved axially, and as a result even more functional tasks may be performed.

Another advantageous development of the invention provides that the rotary switch is the confirm switch. After an indicator symbol has been selected confirmation can be made with the latter without the delay which might occur as a result of groping for a separate confirm switch.

BRIEF DESCRIPTION OF THE DRAWINGS

Particularly advantageous embodiments are presented in diagram form in the following drawings, in which

FIG. 3 a second specific exemplary application for another embodiment of a multifunctional operating device claimed for the invention.

DETAILED DESCRIPTION OF THE INVENTION

The same components or sections of components have been assigned the same identification numbers in the three figures.

Figure 1:
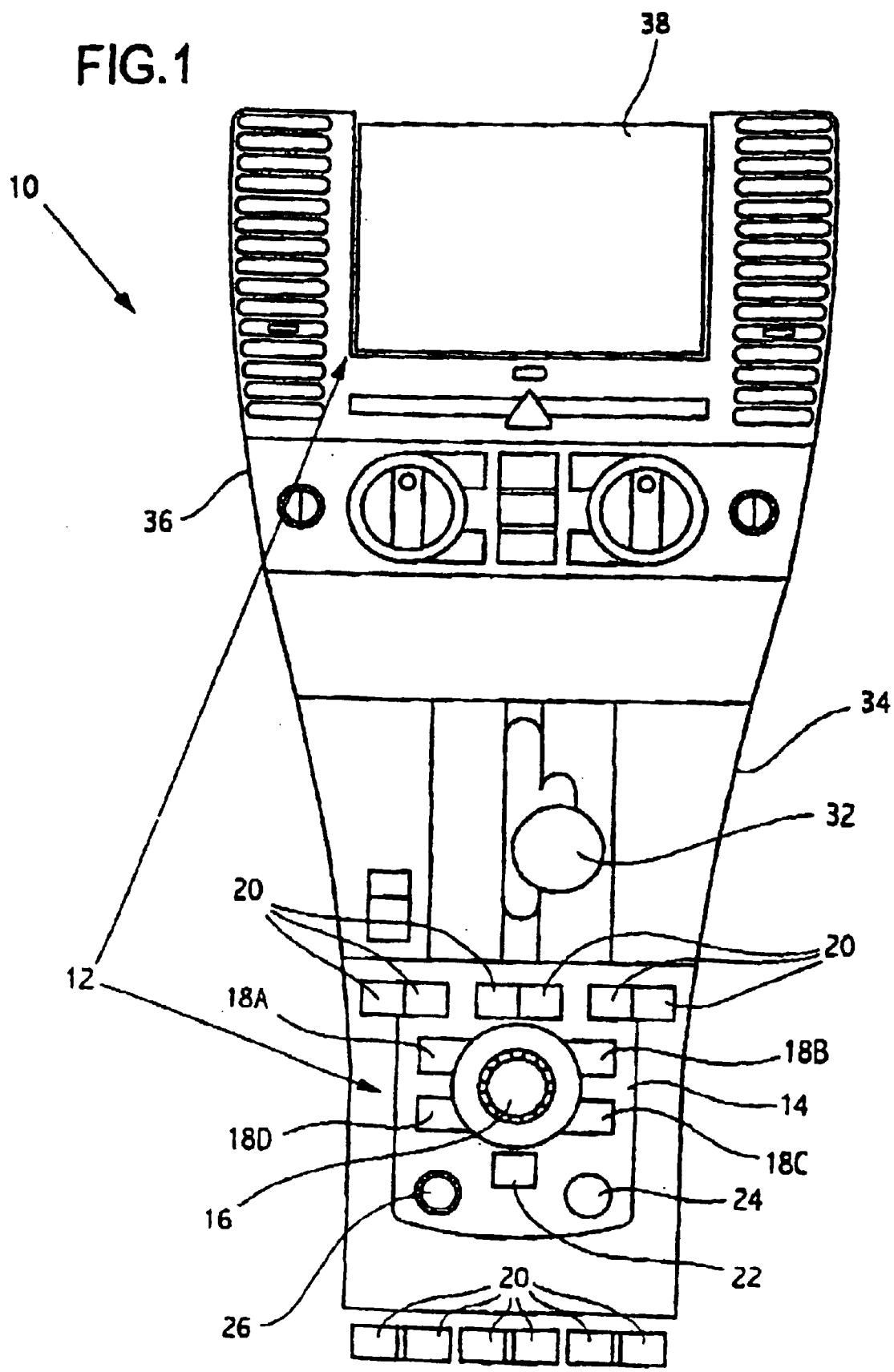
FIG. 1 illustrates a multifunctional operating device as claimed for the invention mounted in a motor vehicle.

FIG. 1 shows the center console 10 of a motor vehicle in which the multifunctional operating device 12 claimed for the invention, presented in diagram form, has been installed. The major components of the multifunctional operating device 12 shown are a monitor unit 38 and a rotary switch 16, which is surrounded by four press switches 18A, 18B, 18C, and 18D. In addition, the multifunctional operating device 12 has six selector switches 20 above the rotary switch 16 and an additional six selector switches 20 mounted below the rotary switch. The individual selector switches 20 are associated with specific function control devices which may be operated after pressing of the corresponding selector switch 20 by the rotary switch 16 and the four press switches 18A, 18B, 18C, and 18D. Mounted below the rotary switch 16 there are also a so-called TALK key 24, a so-called BACK key 22, and a control knob 26 by means of which the sound volume of a mechanism of the motor vehicle may be controlled and simultaneously may be used as an on/off switch. The area of the center console 10 of the motor vehicle in which the rotary switch 16, the press switches 18A, 18B, 18C, and 18D, the selector switches 20, the TALK key, the BACK key 22, and the control knob 16 are located, constitutes the operation control surface of the multifunctional operating device 14. This operation control surface 14 can be reached comfortably by the hand of the user of the multifunctional operating device 12 and also may be found while the driver is keeping his eyes on the road, since the operation control surface is characterized by lateral elevations. The individual switches and keys are also separated from each other by elevations or recesses. Adjacent to the operation control surface 14 at the top is an area 34 in which the gear selection switch 32, for example, may be operated. Below the monitor unit 38 there is an operation control surface 36 for operation of an air conditioning system, the operation control surface 36 having the conventional operation control elements. The monitor unit 38 is positioned high enough so that the user's attention is not diverted from traffic events taking place while briefly examining the monitor unit 38.

Figure 2:
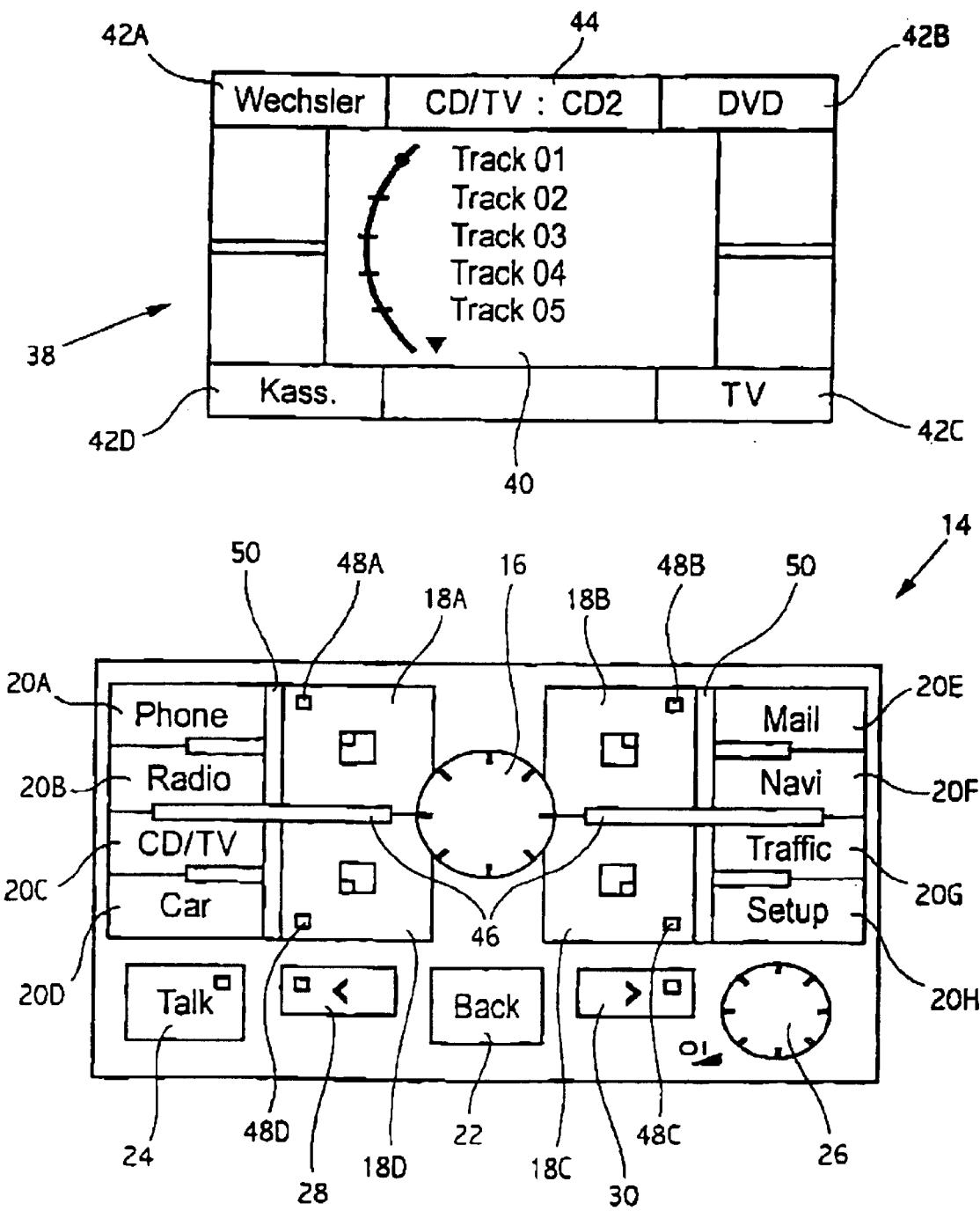
FIG. 2 a first specific exemplary application for another embodiment of a multifunctional operating device claimed for the invention.

Use of the multifunctional operating device 14, 38 is to be described with reference to a first embodiment shown in FIG. 2; the monitor unit 38 and the operation control area 14 are illustrated in connection with one of the operating steps. The press switches 18A, 18B, 18C, and 18D and the rotary switch are separated from each other by elevations 46 and depressions 50. The four press switches 18A, 18B, 18C, and 18D have lamps 48A, 48B, 48C, and 48D each of which lights up after a corresponding press switch 18A, 18B, 18C, or 18D has been pressed. The eight selector switches 20 referred to, also haptically distinguishable, are assigned to the function control devices as follows: 20A telephone, 20B radio set, 20C media, 20D vehicle computer, 20E mail system, 20F navigation system, 20G traffic information system, 20H setup. The selector switches 20 are identified by at least one abbreviation, so that the individual functions of the selector switches 20 are immediately apparent to the user. In the embodiment described here the media selector switch CD/TV was pressed, after which CD/TV appeared in display field 44 as indicator symbol for the function control device selected. This indicator symbol shown in the display field 44 is optically enhanced. At the same time, indicator symbols symbolizing the function control elements subordinate to the function control device selected appear in the display fields 42A, 42B, 42C, and 42d associated with the press switches 18A, 18B, 18C, and 18D. A CD changer (changer), a digital video disc device (DVD), a TV set (TV), and a compact cassette device (cass.) are shown as function control elements. The status of the monitor unit in FIG. 2 is preceded by the following steps: press switch 18A was pressed to select the CD changer, as a result of which the indicator symbol was optically enhanced in the relevant display field 44. At the same time, a menu containing indicator symbols informing the user of the loaded CDS appeared in display field 40. Rotation of the rotary switch 16 selected one of the indicator symbols, and as a result this symbol was simultaneously optically enhanced. The resistance of locking positions associated with the individual indicator symbols in the display field 40 must be overcome during rotation of the rotary switch 16. As a result of pressing of rotary switch 16, also in the form of a press switch, the CD "CD2" selected was transferred to a position allowing playing of the CD. The indicator symbol "CD2" consequently was then presented in on display field 44 to the right of the function control device selected. A menu to be seen in FIG. 2 is displayed at the same time in display field 40. The desired section (track) on the CD could now be selected by rotation of the rotary switch 16. All the indicator symbols of a menu must not necessarily be displayed simultaneously on the monitor unit 38. In the example presented, rotation of the rotary switch 16 causes other areas of the menu, tracks 6–10, for example, to be displayed on the monitor unit 38. An indicator symbol may again be selected by the rotary switch 16, optically enhanced, and activated by pressing of the rotary switch 16. In the present example this results in playing of a specific track on the CD.

In the case presented, pressing of the BACK key 22 would again cause the menu indicating the CDS loaded to appear in the display field 40, and another CD and another track of the other CD could be selected in the manner just described.

The sound volume can be regulated and the multifunctional operating device 14, 38 switched on and off by means of the control knob 26. If another function control element is to be selected, only the corresponding press switch 18B, 18C, or 18D is to be actuated, independently of the operating step last carried out. Should the user wish to operate another multifunctional operating device, he presses the appropriately identified selector switch 20, also independently of the previously executed operating steps.

The TALK key 24 and the arrow keys 28 and 30 shown on the right and left beside the BACK key 22 are used for other functions not described here.

FIG. 3 illustrates an operating step in a second exemplary embodiment of the multifunctional operating device 14, 38 claimed for the invention. The operating area 14 and the monitor unit 38 are again shown. The operating area 14 shown may replace the conventional operating area for operation of an air conditioning system. It is preferably mounted on the center console 10 (not shown here) of a motor vehicle and is designed so that both driver and front-seat passenger may control the air conditioning system in accordance with their particular needs. This is guaranteed by the circumstance that there are positioned to the right and left on the operating area 14 two central rotary switches 16A and 16B each of which is surrounded by four press switches 18A, 18B, 18C, and 18D and respectively 18E, 18F, 18G, and 18H each of which is surrounded by elevations and as a result is haptically distinguishable. Associated with the press switches 18A–18H are specific function control elements which are identified by symbols on the press switches 18A–18H. Selector switches 20 by means of which functions may be selected which are not specific to driver or front-seat passenger are mounted haptically separated from the two press switch and rotary switch layouts described. Such functions include, for example, windshield defogger, air circulation, rear window defogger, the on/off function, and the setup function.

In this exemplary application the indicator symbol 52 indicates that the mode for changing the settings relating to the air conditioning system for the driver side was selected. The function control elements associated with the press switches 18A, 18B, 18C, and 18D are displayed in display fields 42A, 42B, 42C, and 42D on the monitor unit 38 as symbols, along with the corresponding concepts. In the present example air distribution, the volume of air to be delivered, seat warming, and seat ventilation can be affected by pressing the press switches 18A, 18B, 18C, or 18D. If the press switch 18D is pressed, the corresponding symbol with the concept "air volume" is optically enhanced on the monitor unit 38. At the same time, the function control element "air volume" selected is shown in display field 44 to the right of the indicator symbol "air conditioning," the display "air conditioning" making it clear that the air conditioning system is the function control device which can be operated by the user at the moment. There appears on the display field 40 a circular scale on which the quantity of the air volume to be delivered may be selected. This is accomplished by rotation of the rotary switch 16A. The value on the scale selected by the rotary switch 16A is indicated by an arrow and in addition shown in display field 42D. Pressing of rotary switch 16A causes the desired function value of the air conditioning system to be applied. The setting described may be made by the driver or the front-seat passenger, so that each person may assign the settings he desires for his side.

The multifunctional operating device preferably also may have two different monitor units 38 each of which is mounted so as to be optimally visible to the driver or front-seat passenger. The monitor unit 38 for the driver may, for example, be integrated into the cockpit.

The embodiments of the multifunctional operating device indicated in FIGS. 2 and 3 may also be combined.

An additional embodiment of the multifunctional operating device claimed for the invention not illustrated in the figures has six press switches which are mounted around the rotary switch and are also haptically distinguishable. The six press switches may be used to select the six different multifunctional operating devices media, communication, air conditioning system, navigation system, speed control system, and traffic information system; these operating devices are displayed on the monitor unit inside the associated display fields as indicator symbols. If one of the press switches is actuated, function control elements such as "TV set," "radio," "compact cassette equipment," "CD player," "DVD equipment," and "MD equipment" subordinate to the "media" function control device selected. After the function control device "CD player" has been selected by one of the press switches, six different functions appear in the six display fields "CD selection," "start," "stop," "next track," "previous track," and "track selection." One of these functions displayed is selected by pressing of one of the press switches and is carried out. If "start" is selected by pressing of one of the press switches, the CD present in the read position is played. In the case of the "track selection" function, however, it is necessary to determine a function value, in this instance a specific function, which may be selected by means of the rotary switch. This form of embodiment may be a good idea in order to avoid installation of additional selector switches for selecting function control devices and in this way may save space. In addition, functions can be selected very quickly, without looking at the screen for a protracted period. This is an advantage especially in the case of functions frequently selected.

What is claimed is:

1. A multifunctional operating device for installation in a vehicle with a rotary switch for selection of functions which may be displayed in a plurality of display fields on a monitor unit, characterized in that the multifunctional operating device has a combination made up of the rotary switch and a plurality of press switches, the press switches being mounted around the rotary switch, in that the press switches are configured in such a way that they are haptically distinguishable, and in that an arrangement of display fields on the monitor unit which are associated with the press switches correspond at least schematically to an arrangement of the press switches.

2. The multifunctional operating device as specified in claim 1, wherein a position of the display field associated with the rotary switch relative to that of the display fields associated with the press switches corresponds at least schematically to a position of the rotary switch relative to the pressure switches.

3. The multifunctional operating device as specified in claim 1, wherein a minimum of one indicator symbol may be shown within a display field, it being possible for one function control device, one function control element, one function, or function value to be symbolized by one indicator symbol.

4. The multifunctional operating device as specified in claim 3, wherein the indicator symbol in the display field associated with the press switch may be selected by operation of one of the press switches and wherein the selected indicator symbol is optically enhanced during said selection.

5. The multifunctional operating device as specified in claim 4, wherein additional indicator symbols may be called up in the display fields associated with the press switches by operation of one of the press switches.

6. The multifunctional operating device as specified in claim 3, wherein additional indicator symbols may be called up in the display fields associated with the press switches by operation of one of the press switches.

7. The multifunctional operating device as specified in claim 3, wherein a menu containing at least one indicator symbol may be called up by operation of one of the press switches, it being possible to display the menu in the display field associated with the rotary switch.

8. The multifunctional operating device as specified in claim 7, wherein one of the indicator symbols or the indicator symbol in the display field associated with the rotary switch may be selected by rotation of the rotary switch and the selected indicator symbol is optically enhanced during said selection.

9. The multifunctional operating device as specified in claim 3, wherein one of the indicator symbols or the indicator symbol in the display field associated with the rotary switch may be selected by rotation of the rotary switch and the selected indicator symbol is optically enhanced during said selection.

10. The multifunctional operating device as specified in claim 9, wherein, as a result of operation of a confirm switch after selection of the indicator symbol by the rotary switch, the function control device or the function control element may be is activated, the function may be executed, the value of the value may be converted, or the written character may be set.

11. The multifunctional operating device as specified in claim 10, wherein, as a result of operation of one or more confirm switches, a submenu which is associated with the indicator symbol selected by the rotary switch and which comprises at least one indicator symbol, may be displayed within a display field associated with the rotary switch.

12. The multifunctional operating device as specified in claim 9, wherein, as a result of operation of one or more confirm switches, a submenu which is associated with the indicator symbol selected by the rotary switch and which comprises at least one indicator symbol, may be displayed within a display field associated with the rotary switch.

13. The multifunctional operating device as specified in claim 1, wherein, as a result of operation of one of the press switches, a function control device or a function control element is activated or a function is executed or a function value is converted.

14. The multifunctional operating device as specified in claim 1, wherein the multifunctional operating device has at least one selector switch by means of which an additional function control device to be operated is selected, the selector switch being in the form of a rotary, press, or sliding switch.

15. The multifunctional operating device as specified in claim 14, wherein, after operation of the selector switch, the function control device selected may be presented on the monitor unit as an indicator symbol within a display field provided for this purpose.

16. The multifunctional operating device as specified in claim 15, wherein, after operation of the selector switch, the function control elements and/or functions and/or function values may be displayed as indicator symbols within the display fields which are associated with the press switches.

17. The multifunctional operating device as specified in claim 14, wherein, after operation of the selector switch, the function control elements and/or functions and/or function values may be displayed as indicator symbols within the display fields which are associated with the press switches.

18. The multifunctional operating device as specified in claim 1, wherein the rotary switch is also a press switch.

19. The multifunctional operating device as specified in claim 18, wherein the rotary switch is a confirm switch.

20. The multifunctional operating device as specified in claim 1, wherein the multifunctional operating device may be use to operate at least one function control device, each function control device selected from the group consisting of a radio set, a compact cassette unit, a TV set, a compact disc player, a vehicle computer, a telephone, a theft prevention system, an air conditioning unit control unit, a time control and time display unit, a navigation system, a traffic information system, a mail system and a speed control system.

* * * * *